(12) United States Patent
Creviston (10) Patent No.: US 9,371,810 B2
(45) Date of Patent: Jun. 21, 2016

(54) ALTERNATOR-STARTER ASSEMBLY HAVING GEAR REDUCTION SYSTEM

(71) Applicant: Remy Technologies LLC, Pendleton, IN (US)

(72) Inventor: Alex Creviston, Muncie, IN (US)

(73) Assignee: Remy Technologies, LLC, Pendleton, IN (US)

(*) Notice: Subject to any disclaimer, the term of this patent is extended or adjusted under 35 U.S.C. 154(b) by 124 days.

(21) Appl. No.: 14/212,680

(22) Filed: Mar. 17, 2014

(65) Prior Publication Data

US 2014/0265331 A1 Sep. 18, 2014

Related U.S. Application Data

(60) Provisional application No. 61/789,736, filed on Mar. 15, 2013.

(51) Int. Cl.

| | |
|---|---|
| *F02N 11/04* | (2006.01) |
| *H02K 23/52* | (2006.01) |
| *H02P 9/04* | (2006.01) |
| *H02K 7/06* | (2006.01) |
| *H02K 7/10* | (2006.01) |
| *F02N 15/04* | (2006.01) |
| *H02K 7/00* | (2006.01) |
| *F02N 15/02* | (2006.01) |

(52) U.S. Cl.
CPC .............. *F02N 11/04* (2013.01); *F02N 15/043* (2013.01); *H02K 7/006* (2013.01); *F02N 15/022* (2013.01); *F02N 15/046* (2013.01)

(58) Field of Classification Search
CPC ......... F16H 3/005; F16H 1/46; F16H 1/2854; F16H 3/62

USPC ............ 290/46–48, 1 C, 40 C, 38 R; 310/83, 310/76–78, 92, 98–99, 96, 102 R, 75 R; 475/13

See application file for complete search history.

(56) References Cited

U.S. PATENT DOCUMENTS

| 406,968 | A | * | 7/1889 | Tesla | ...................... H02K 31/02 310/178 |
|---|---|---|---|---|---|
| 1,262,691 | A | * | 4/1918 | O'Neill | .................. B60K 17/28 123/179.28 |

(Continued)

FOREIGN PATENT DOCUMENTS

WO 2011136652 A1 11/2011

*Primary Examiner* — Julio C. Gonzalez
*Assistant Examiner* — Charles Reid, Jr.
(74) *Attorney, Agent, or Firm* — Maginot, Moore & Beck LLP (57) ABSTRACT

An alternator-starter assembly for an internal combustion engine having a crankshaft and a drive member operatively connected to the crankshaft. The alternator-starter assembly includes an electric machine, a transmission assembly, and a controller. The electric machine includes a stator and a rotor that is configured for rotation relative to the stator. The transmission assembly includes a first drive shaft operatively connected to the rotor, a second drive shaft operatively connected to the drive member, and a gear assembly operatively connected to the first drive shaft and the second drive shaft. The controller is connected to the electric machine and is configured to operate the electric machine as a generator when the gear assembly is in a first gear configuration and to operate the electric machine as a motor when the gear assembly is in a second gear configuration.

18 Claims, 5 Drawing Sheets

(56) References Cited

U.S. PATENT DOCUMENTS

| | | | | |
|---|---|---|---|---|
| 1,525,279 | A * | 2/1925 | Downey | F16H 3/005 188/82.9 |
| 1,611,118 | A * | 12/1926 | Lanquetin | F02N 15/046 475/13 |
| 1,644,065 | A * | 10/1927 | Lanquetin | F02N 15/02 123/179.25 |
| 2,209,641 | A * | 7/1940 | Weber | B62D 11/14 180/6.5 |
| 2,466,427 | A * | 4/1949 | Hoover | F16H 3/003 290/31 |
| 2,600,762 | A * | 6/1952 | Hartz | F02N 15/046 475/13 |
| 2,672,565 | A * | 3/1954 | Helmer | H02K 49/06 310/99 |
| 2,880,628 | A * | 4/1959 | Dobrohruska | F16H 37/00 123/179.28 |
| 3,006,221 | A * | 10/1961 | Cromwell | F02B 63/04 123/179.25 |
| 4,862,009 | A | 8/1989 | King | |
| 6,048,289 | A * | 4/2000 | Hattori | B60K 6/48 180/65.25 |
| 6,278,196 | B1 * | 8/2001 | Ehrhart | B60K 6/485 180/65.31 |
| 6,371,877 | B1 | 4/2002 | Schroeder | |
| 6,455,947 | B1 * | 9/2002 | Lilley | B60K 6/38 180/65.6 |
| 6,554,088 | B2 * | 4/2003 | Severinsky | B60H 1/004 180/65.23 |
| 6,695,082 | B2 * | 2/2004 | Bitsche | B60K 6/36 123/179.28 |
| 6,821,223 | B2 * | 11/2004 | Henry | F01L 1/34 474/109 |
| 7,174,714 | B2 * | 2/2007 | Algrain | F02D 37/00 290/40 A |
| 7,751,965 | B2 * | 7/2010 | Ando | F02P 5/1506 123/179.3 |
| 8,460,152 | B2 * | 6/2013 | Parsons | F16H 41/07 475/283 |
| 8,702,556 | B2 * | 4/2014 | Jimbo | F16D 41/00 192/41 R |
| 8,826,878 | B2 * | 9/2014 | Robinette | F02N 11/0851 123/179.25 |
| 2003/0116368 | A1 | 6/2003 | Winkelman | |
| 2004/0164560 | A1 * | 8/2004 | Odahara | B60K 6/48 290/40 C |
| 2006/0174624 | A1 * | 8/2006 | Grabowski | B60K 6/40 60/709 |
| 2008/0169138 | A1 * | 7/2008 | Grand | B60K 6/48 180/65.265 |
| 2008/0272603 | A1 * | 11/2008 | Baca | B60K 6/485 290/55 |
| 2008/0275624 | A1 * | 11/2008 | Snyder | B60K 6/365 701/104 |
| 2011/0015020 | A1 | 1/2011 | Grosser | |
| 2013/0049460 | A1 * | 2/2013 | Herbig | H02P 9/48 307/10.1 |
| 2013/0085029 | A1 * | 4/2013 | Ono | B60K 6/365 475/5 |
| 2013/0221810 | A1 * | 8/2013 | Gopalakrishnan | H02K 29/06 310/68 B |

* cited by examiner

ALTERNATOR-STARTER ASSEMBLY HAVING GEAR REDUCTION SYSTEM

CROSS-REFERENCE TO RELATED APPLICATIONS

The present application claims priority from U.S. provisional patent application No. 61/789,736, filed Mar. 15, 2013.

FIELD

The present disclosure relates to the field of alternator-starter assemblies, and particularly to an alternator-starter assembly operable in a first gear configuration and a second gear configuration.

BACKGROUND

Vehicles powered by an internal combustion engine typically include a starter assembly and an alternator assembly. The starter assembly is used to start the engine when operation of the engine is desired. The starter is typically coupled to a bottom side of the engine. The starter assembly includes an electric motor and a drive mechanism. The electric motor is energized by a battery upon closing of an ignition switch. The drive mechanism meshingly engages a flywheel of the engine to transfer the torque of the electric motor to a crankshaft of the engine. Rotation of the crankshaft causes the engine to start, at which point the electric motor is de-energized and the drive mechanism is disengaged from the flywheel.

The alternator assembly associated with a typical internal combustion engine is a separate assembly from the starter assembly, and is used to generate electricity for charging the above-mentioned battery and for powering vehicle accessories, such as lighting. The alternator assembly is typically mounted at the front of the engine by a bracket or the like. The alternator assembly includes an electric machine configured as a generator and including a rotor and a stator. The rotor is connected to the engine crankshaft by a belt-drive system including pulleys and at least one endless belt. Operation of the engine turns the belt, resulting in rotation of the rotor. Rotation of the rotor relative to the stator generates electricity.

Instead of a separate starter assembly and alternator assembly, some vehicles include a belt alternator-starter assembly ("BAS"), which is a single unit that combines the functionality of a starter assembly and an alternator assembly. The BAS is typically positioned at the front of the engine in the typical position of an alternator. The BAS is connected to the engine crankshaft by a belt-drive system that includes pulleys and at least one endless belt. The BAS includes an electric machine having a stator and a rotor. The electric machine is selectively operable as an electric motor or a generator.

In order to start the engine, the BAS is operated as an electric motor and is connected to the battery, which causes the rotor to generate a torque. The belt-drive system transfers the torque generated by the BAS to the engine crankshaft to rotate the crankshaft and to start the engine.

After the engine is started, the BAS is operated as a generator/alternator. When configured as a generator the belt-drive system transfers torque generated by the engine crankshaft to the rotor, which causes the rotor to rotate relative to the stator and to generate electricity. The generated electricity is used to charge the battery and to power vehicle accessories, such as lighting.

When starting the engine with the BAS, the electric machine is subject to a high torque/low angular velocity load; however, when the BAS is operated as a generator the electric machine is subject to a low torque/high angular velocity load. To make the BAS operate effectively in both situations, the electric machine is typically made to be larger and more powerful than the electric machine of a typical alternator, since the electric machine of a typical alternator would not be powerful enough when operated as an electric motor. As a result of having a larger and more powerful electric machine, the typical BAS is more expensive to manufacture than the typical alternator assembly. Accordingly, it would be desirable to reduce the manufacturing cost a BAS.

SUMMARY

According to one embodiment of the disclosure, an alternator-starter assembly is associated with an internal combustion engine having a crankshaft and a drive member operatively connected to the crankshaft. The alternator-starter assembly includes an electric machine, a transmission assembly, and a controller. The electric machine includes a stator and a rotor. The rotor is configured for rotation relative to the stator. The transmission assembly includes (i) a first drive shaft operatively connected to the rotor, (ii) a second drive shaft operatively connected to the drive member, and (iii) a gear assembly operatively connected to the first drive shaft and the second drive shaft. The gear assembly is configurable in a first gear configuration and a second gear configuration. The controller is operatively connected to the electric machine and is configured to operate the electric machine as a generator when the gear assembly is in the first gear configuration and to operate the electric machine as a motor when the gear assembly is in the second gear configuration.

According to another embodiment of the disclosure, an alternator-starter assembly is associated with an internal combustion engine including a crankshaft and an engine drive member operatively connected to the crankshaft. The alternator-starter assembly includes an electric machine, a planetary gear assembly, a center shaft, a first differential, a second differential, and a clutch assembly. The planetary gear assembly includes a ring gear, a plurality of planet gears, and a sun gear defining an opening. The center shaft extends through the opening. The first differential assembly is operatively connected to the sun gear, the center shaft, and the electric machine. The second differential assembly is operatively connected to the plurality of planet gears, the center shaft, and the engine drive member. The clutch assembly is operatively connected to the sun gear and the second differential assembly. The clutch assembly is configurable in a starter mode and an alternator mode.

According to yet another embodiment of the disclosure, a method of operating a starter-alternator assembly associated with an internal combustion engine including a crankshaft and an engine drive member operatively connected to the crankshaft includes configuring a transmission assembly of the starter-alternator assembly in a first gear configuration and rotating the engine drive member with an electric machine of the starter-alternator assembly. The method further includes configuring the transmission assembly in a second gear configuration and rotating a rotor of the electric machine with the engine drive member. The transmission assembly is positioned between the electric machine and the engine drive member.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

For the purpose of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

Figure 1:
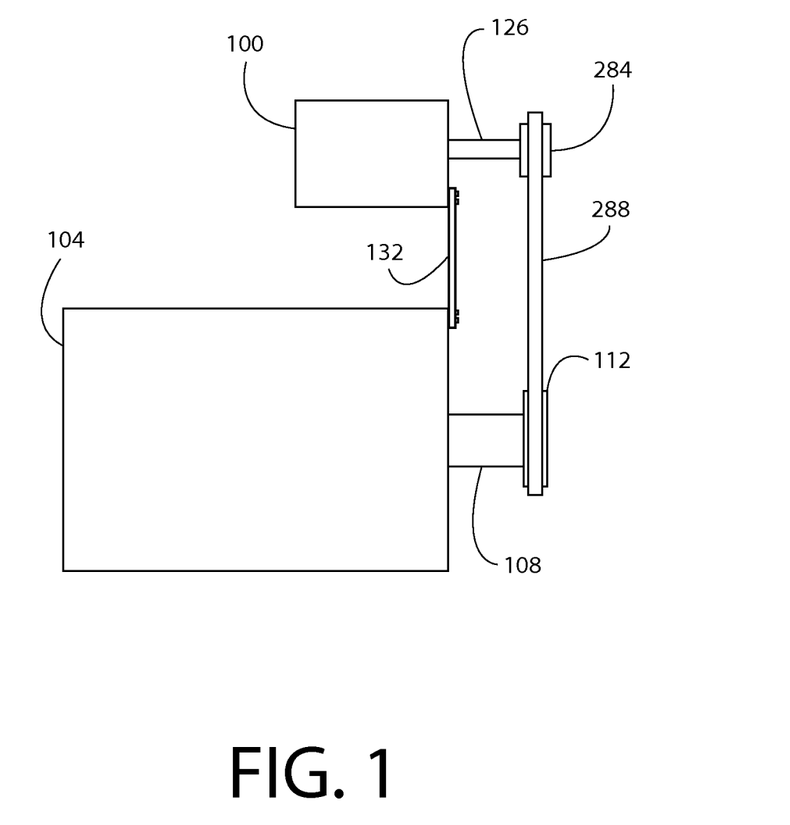
FIG. 1 is a block diagram showing an alternator-starter assembly, as described herein, connected to an internal combustion engine.

As shown in FIG. 1, an alternator-starter assembly, referred to as a belt alternator starter ("BAS") 100, is associated with an internal combustion engine 104. The internal combustion engine 104 includes a crankshaft 108 and a pulley 112. The pulley 112 is connected to the crankshaft 108 for rotation with the crankshaft. As used herein, the terms "connected," "operatively connected," "coupled," "operatively coupled," and the like include a direct or an indirect joining of two or more elements. Accordingly, the pulley 112 may be in direct contact with the crankshaft 108 or an intermediate element or elements may be interposed between the pulley and the crankshaft. In each case, the pulley 112 is connected to the crankshaft 108. The pulley 112 is referred to as a drive member of the engine 104, since operation of the engine results in rotation of the crankshaft 108 and the pulley. The engine 104 may be provided as any engine known to those of ordinary skill in the art, including the engine of a hybrid vehicle.

Figure 2:
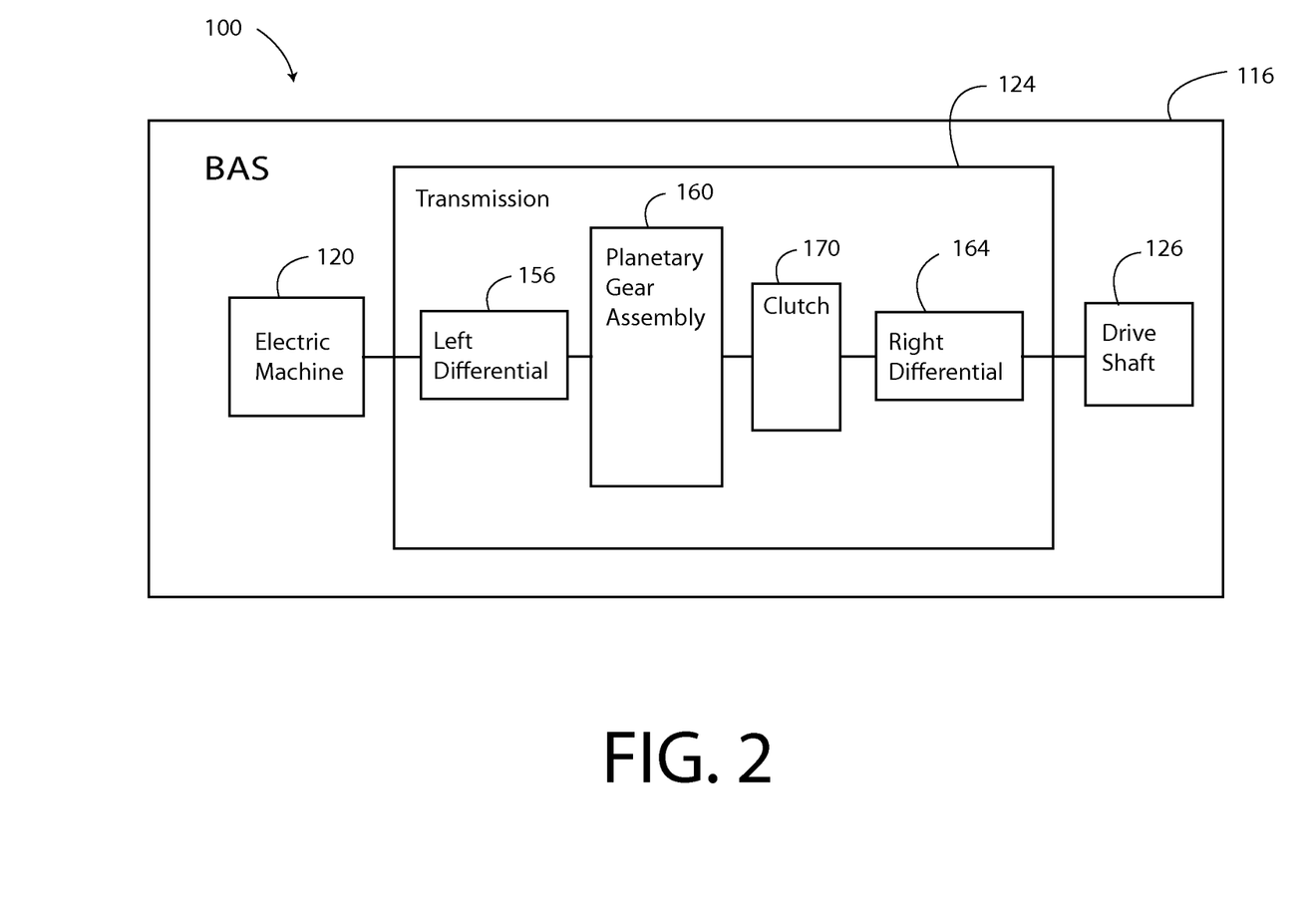
FIG. 2 is a block diagram showing components of the alternator-starter assembly of FIG. 1.

As shown in FIG. 2, the BAS 100 includes a housing 116, an electric machine 120, a transmission assembly 124, and a drive shaft 126. The housing 116 is typically connected to the engine 104 by a bracket 132 (FIG. 1) or other attachment member. The electric machine 120, the transmission assembly 124, and the drive shaft 126 are at least partially positioned in the housing 116. The housing 116 may be at least partially filled with a lubricant for lubricating the transmission assembly 124. The lubricant may be oil that is used to lubricate the engine 104. The housing 116 is made from aluminum, iron, steel, or the like.

Figure 3:
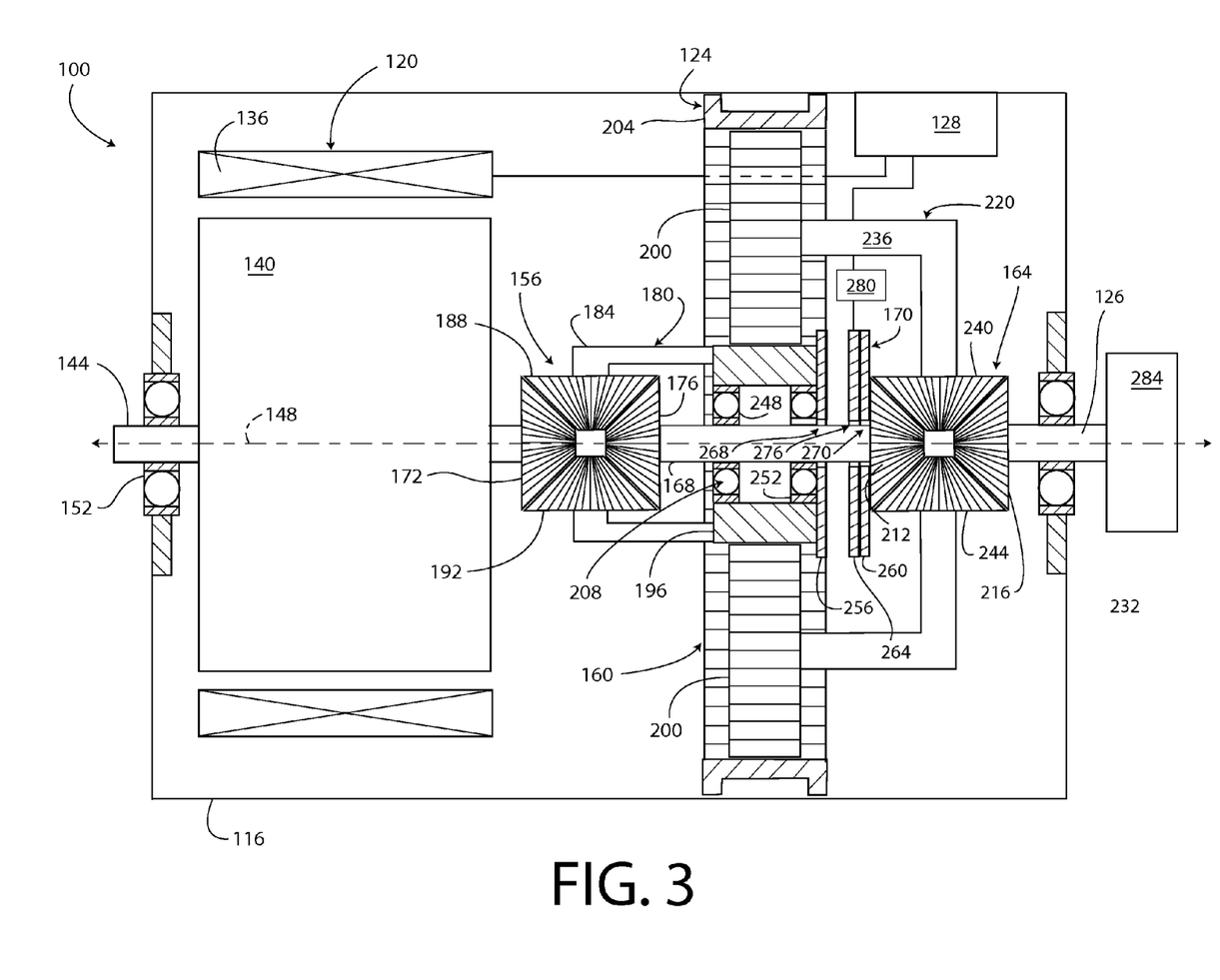
FIG. 3 is cross-sectional view of the alternator-starter assembly of FIG. 1, with a clutch assembly of the alternator-starter assembly shown configured in a starter mode.

As shown in FIG. 3, the electric machine 120 includes a stator 136 and a rotor 140. The stator 136 is fixedly connected to the housing 116 and is prevented from rotating relative to the housing. The rotor 140 is mounted to the housing 116 for rotation relative to the stator 136. In particular, a shaft 144 extends through the rotor 140 and defines an axis of rotation 148 of the rotor. The shaft 144, which may also be referred to herein as a drive shaft, is rotatably mounted at one end to the housing 116 by a bearing 152.

With reference again to FIG. 2, the transmission assembly 124 includes a left differential assembly 156, a planetary gear assembly 160, a clutch assembly 170, and a right differential assembly 164. As shown in FIG. 3, the left differential assembly 156 includes a left differential gear member 172, a right differential gear member 176, and a spider assembly 180. The left differential gear member 172 is fixedly connected to the shaft 144 of the rotor 140 for rotation with the rotor. In the disclosed embodiment, the left differential assembly 156 is a bevel gear differential, and accordingly the left differential gear member 172 is shown as a bevel gear. However, it will be recognized to those of ordinary skill in the art that in the left differential assembly 156 may be provided as a different type of differential, and accordingly the left differential gear member 172 may be a different type of gear in alternative embodiments. The right differential gear member 176 is substantially identical to the left differential gear member 172 and is connected to a center shaft 168 for rotation with the center shaft.

The spider assembly 180 includes a carrier 184, an upper spider gear member 188, and a lower spider gear member 192. The carrier 184 is connected to the planetary gear assembly 160, such that the carrier is rotatable about the axis of rotation 148. The upper spider gear member 188 and the lower spider gear member 192 are rotatably connected to the carrier 184 and are configured for rotation about an axis of rotation that is perpendicular to the axis of rotation 148. The upper spider gear member 188 is meshingly engaged with the left differential gear member 172 and the right differential gear member 176, and the lower spider gear member 192 is meshingly engaged with the left differential gear member 172 and the right differential gear member 176. Accordingly, the left differential gear member 172 and the right differential gear member 176 are operatively connected to the spider assembly 180, such that rotation of the left differential gear member 172 results in rotation of the upper spider gear member 188 and the lower spider gear member 192. The upper spider gear member 188 and the lower spider gear member 192 are substantially identical to the left differential gear member 172 and the right differential gear member 176. Accordingly, the left differential assembly 156 operates as known to those of ordinary skill in the art.

With continued reference to FIG. 3, the planetary gear assembly 160 includes a sun gear 196, planet gears 200, and a ring gear 204, as will be recognized by those of ordinary skill in the art. The sun gear 196 is connected to the carrier 184 and defines an opening 208. The planetary gear assembly 160 includes three of the planet gears 200, although only two of the planet gears are shown. The planet gears 200 are meshingly engaged with the sun gear 196. The ring gear 204 is fixedly connected to the housing 116. The ring gear 204 is meshingly engaged with the planet gears 200.

As shown in FIG. 3, the right differential assembly 164 is substantially identical to the left differential assembly 156 and includes a left differential gear member 212, a right differential gear member 216, and a spider assembly 220. The left differential gear member 212 is fixedly connected to the center shaft 168 for rotation with the center shaft. In the disclosed embodiment, the right differential assembly 164 is a bevel gear differential, and accordingly the left differential gear member 212 is shown as a bevel gear. However, it will be recognized to those of ordinary skill in the art that in the right differential assembly 164 may be provided as a different type of differential, and accordingly the left differential gear member 212 may be a different type of gear in alternative embodiments. The right differential gear member 216 is substantially identical to the left differential gear member 212 and is fixedly connected to the drive shaft 126, which is rotatably mounted at one end to the housing 116 by a bearing 232.

The spider assembly 220 includes a carrier 236, an upper spider gear member 240, and a lower spider gear member 244. The carrier 236 is connected to the planet gears 200, such that the carrier rotates about the axis of rotation 148 as the planet gears revolve about the axis of rotation. The upper spider gear member 240 and the lower spider gear member 244 are rotatably connected to the carrier 236 and are configured for rotation about an axis of rotation that is perpendicular to the axis of rotation 148. The upper spider gear member 240 is meshingly engaged with the left differential gear member 212 and the right differential gear member 216, such that the left differential gear member 212 and the right differential gear member 216 are operatively connected to the spider assembly 220, such that rotation of the upper spider gear member 240 and the lower spider gear member 244 results in rotation of the left differential gear member 212 and the right differential gear member 216. Similarly, the lower spider gear member 244 is meshingly engaged with the left differential gear member 212 and the right differential gear member 216. The upper spider gear member 240 and the lower spider gear member 244 are substantially identical to the left differential gear member 212 and the right differential gear member 216. Accordingly, the right differential assembly 164 operates as known to those of ordinary skill in the art.

The transmission assembly 124 further includes the center shaft 168, which extends through the opening 208 defined by the sun gear 196. The center shaft 168 is rotatably supported by a bearing 248 and a bearing 252. The bearing 248 and the bearing 252 are positioned in the opening 208 of the sun gear 196. Accordingly, the center shaft 168 is mounted for rotation relative to the sun gear 196. The center shaft 168 rotates about the axis of rotation 148.

The clutch assembly 170 includes an alternator member 256, a starter member 260, a movable member 264, and a controller 128. The alternator member 256 is a generally circular disc that is fixedly connected to the sun gear 196. The alternator member 256 defines an opening 268 through which the center shaft 168 extends. The alternator member 256 is made of a material having a high coefficient of friction, suitable to engage the movable member 264.

The starter member 260 is a generally circular disc that is fixedly connected to the left differential gear member 212 and to the center shaft 168. The starter member 260 defines an opening 270 through which the center shaft 168 extends. The starter member 260 is made of the same or a similar material as the alternator member 256.

The movable member 264 is a generally circular disc that is positioned between the alternator member 256 and the starter member 260. The movable member 264 defines an opening 276 through which the center shaft 168 extends. The movable member 264 is made of the same or a similar material as the alternator member 256.

Figure 4:
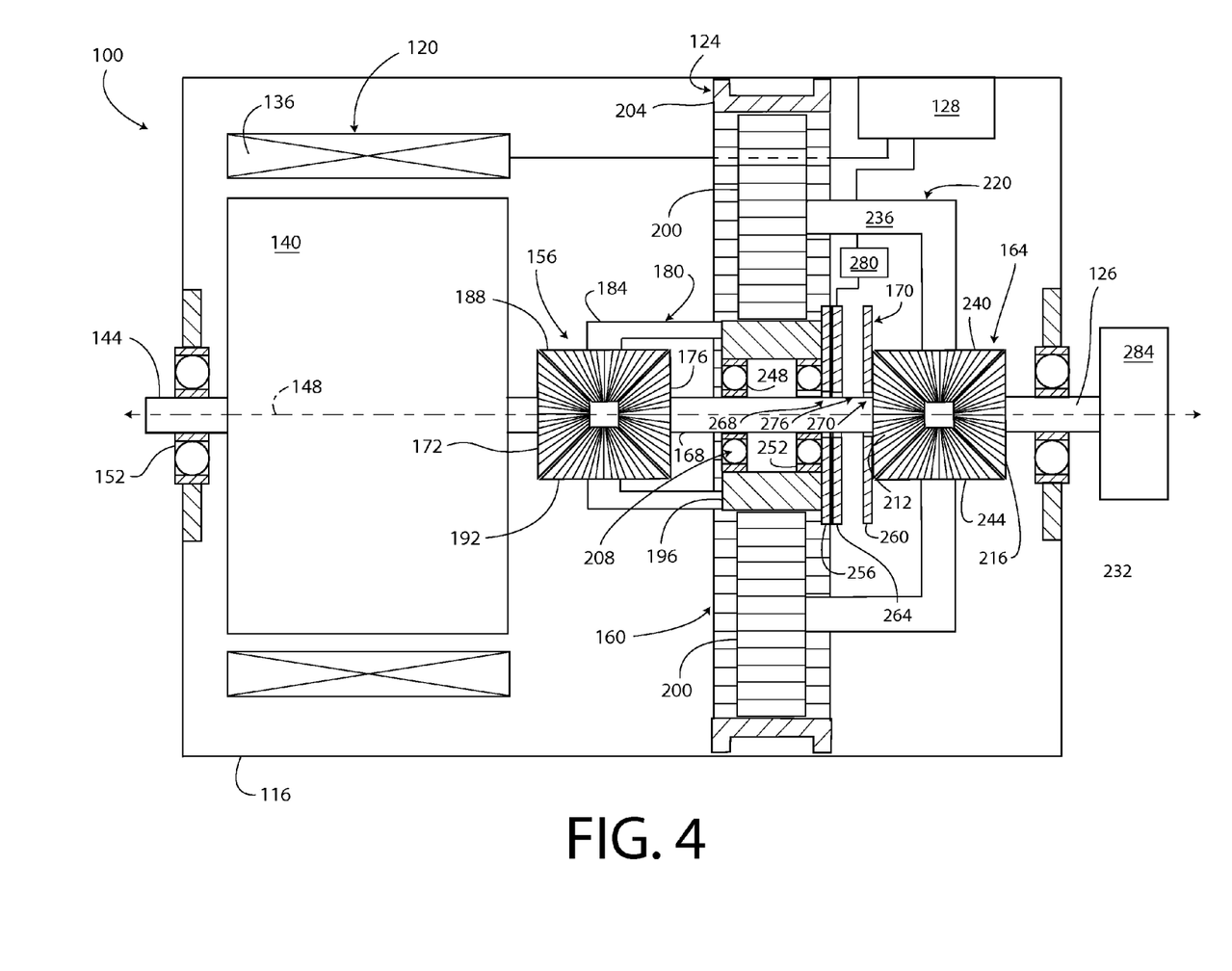
FIG. 4 is cross-sectional view of the alternator-starter assembly of FIG. 1, with the clutch assembly of the alternator-starter assembly shown configured in an alternator mode.

The movable member 264 is selectively positionable against the alternator member 256 and the starter member 260. In particular, the movable member 264 is movable in a direction generally parallel to the axis of rotation 148 between two opposite positions. In a first position, the movable member is positioned against and engages the alternator member 256. In a second position, the movable member is positioned against and engages the starter member 260. When the movable member 264 is positioned against the alternator member 256 (as shown in FIG. 4), the alternator member is prevented from rotating relative to the movable member and the BAS 100 is configured in an alternator mode. When the movable member 256 is positioned against the starter member 260 (as shown in FIG. 3), the starter member is prevented from rotating relative to the movable member and the BAS 100 is configured in a starter mode, as explained in further detail below.

The clutch assembly 170 further includes a positioning assembly 280 that is configured to move the movable member 264 to the alternator position and to the starter position, in a way that is known to one of ordinary skill in the art. For example, the positioning assembly 280 may position the movable member 264 with springs or another device (not shown) that is suitable for maintaining the position of the movable member.

The controller 128 is electrically connected to the positioning assembly 280 and to the electric machine 120. The controller 128 sends an electric signal, referred to as a starter signal, to the positioning assembly 280 to move the movable member 264 from the starter position (FIG. 3) to the alternator position (FIG. 4). The controller 128 stops sending the electric signal to cause the movable member 264 to return to the alternator position. Alternatively, the controller 128 may send an alternator signal to the positioning assembly 280 to cause the movable member 264 to return to the alternator position. When the clutch assembly 170 is configured in the alternator mode (FIG. 4) the controller 128 is configured to operate the electric machine 120 as an alternator/generator. When the clutch assembly 170 is configured in the starter mode (FIG. 3) the controller 128 is configured to operate the electric machine 120 as a motor.

Figure 5:
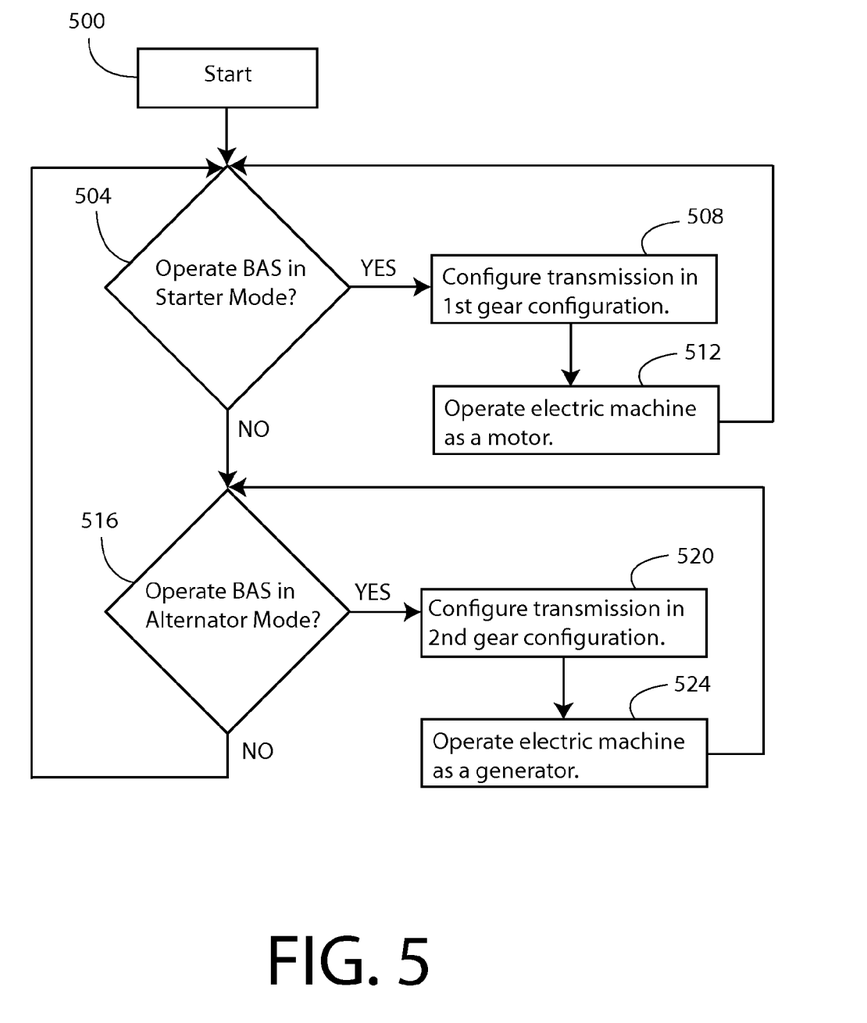
FIG. 5 is a flowchart depicting a method of operating the alternator-starter assembly of FIG. 1.

As shown in FIG. 5, the BAS 100 is operable as a starter motor and as an alternator. Starting at block 500 and block 504, controller 128 determines if the BAS 100 should be operated in the starter mode. As shown in block 508, if the BAS 100 should be operated in the starter mode then the transmission assembly 124 is configured a first gear configuration by configuring the clutch assembly 170 in the starter mode, as shown in FIG. 3. The clutch assembly 170 is configured in the starter mode when the controller 128 sends an electric signal to the clutch assembly that causes the movable member 264 to move and to be positioned against the starter member 260. Positioning the movable member 264 against the starter member 260 causes the movable member to engage with the starter member and to prevent rotation of the starter member, the center shaft 168, the right differential gear member 176, and the left differential gear member 212. In the starter mode, the clutch assembly 170, enables rotation of the sun gear 196, the planet gears 200, the spider assembly 180, and the spider assembly 220.

Next, as shown in block 512 the controller 128 operates the electric machine 120 as a motor. When the electric machine 120 is operated as a motor the rotor 140 generates a torque on the shaft 144, which causes the shaft 144 and the rotor to rotate relative to the stator 136. The rotation of the rotor 140 causes the shaft 144 and the left differential gear member 172 to rotate.

The rotation of the left differential gear member 172 causes rotation of the spider assembly 180. In particular, the upper spider gear member 188 and the lower spider gear member 192 rotate relative to the carrier 184 about an axis of rotation that is perpendicular to the axis of rotation 148. Also, the carrier 184 rotates about the axis of rotation 148. As a result of the rotation of the carrier 184, the upper spider gear member 188 and the lower spider gear member 192 also revolve about the axis of rotation 148. The right differential member 176 is prevented from rotating by the clutch assembly 170.

The rotation of the carrier 184 causes the sun gear 196 and the alternator member 256 to rotate about the axis of rotation 148. Rotation of the sun gear 196 causes the planet gears 200 to rotate and to revolve about the axis of rotation 148. The ring gear 204 does not rotate, since it is fixedly attached to the housing 116.

Revolution of the planet gears 200 is transferred to the right differential assembly 164. Specifically, the revolution of the planet gears 200 causes the carrier 236 to rotate about the axis of rotation 148. As the carrier 236 rotates it causes the upper spider gear member 240 and the lower spider gear member 244 to rotate relative to the carrier about an axis of rotation that is perpendicular to the axis of rotation 148. As a result of the rotation of the carrier 236, the upper spider gear member 240 and the lower spider gear member 244 also revolve about the axis of rotation 148. The planetary gear assembly 160 is operatively connected to the shaft 144 and to the shaft 126, such that the movement of the upper spider gear member 240 and the lower spider gear member 244 causes the right differential gear member 216 and the shaft 126 to rotate about the axis of rotation 148. In the starter mode, the clutch assembly 170 prevents the left differential gear member 212. Also in the starter mode, the transmission assembly 124 transfers torque generated by the electric machine 120 from the shaft 144 and the differential assembly 156 to the shaft 126 and the differential assembly 164, thereby causing the drive member 112 to rotate.

With reference again to FIGS. 2 and 3, a pulley 284 is fixedly connected to the shaft 126 for rotation with the shaft. A belt 288 is operatively connected to the pulley 284 and the drive member 112, such that rotation of the pulley results in rotation of the drive member and rotation of the drive member results in rotation of the pulley. Rotation of the drive member 112 causes rotation of the crankshaft 108, which starts the engine 104.

In the starter mode the shaft 126 and the pulley 284 rotate with less angular velocity than the rotor 140. Accordingly, one rotation of the rotor 140 results in less than one rotation of the pulley 284 when the BAS 100 is in the starter mode. However, the pulley 284 rotates with more torque than does the rotor 140 as a result of the mechanical advantage provided by the planetary gear assembly 160. Accordingly, the electric machine 120 can be smaller (and less expensively), and the BAS 100 is still capable of generating enough torque to start the engine 104. Also, since the rotation of the rotor 140 is transmitted through two differential assemblies 156, 164 the pulley 284 rotates in the same direction as does the rotor. For example, when the rotor 140 and the left differential gear member 188 rotate in a drive direction the pulley 284 and the right differential gear member 216 also rotate in the drive direction.

As shown in block 504 of FIG. 5, if the BAS 100 should not operate in the starter mode, then, in block 516, the controller 128 determines if the BAS should operate in the alternator mode. In block 520, if the BAS 100 should operate in the alternator mode, the controller 128 configures the transmission assembly 124 in a second gear configuration by configuring the clutch assembly 170 in the alternator mode. The clutch assembly 170 is configured in the alternator mode when the controller 128 sends an electric signal to the clutch assembly that causes the movable member 264 to move and to be positioned against the alternator member 256, as shown in FIG. 4. Alternatively, the clutch assembly 170 is configured in the alternator mode when the controller 128 stops sending the starter signal to the clutch assembly. Positioning the movable member 264 against the alternator member 256 causes the movable member to engage the alternator member and to prevent rotation of the alternator member, the sun gear 196, the planet gears 200, the carrier 184, and the carrier 236. In the alternator mode the clutch assembly 170 enables rotation of the center shaft 168.

Next, as shown in block 524 the controller 128 operates the electric machine 120 as a generator. When the electric machine 120 is operated as a generator the pulley and the shaft are rotated by the drive member 112 of the engine 104. The rotation of the shaft 126 causes the right differential gear member 216 to rotate.

When the right differential member 216 rotates it causes the upper spider gear 240 and the lower spider gear member 244 to rotate relative to the carrier 220. However, the rotation of the right differential gear member 216 does not cause the carrier 236 to rotate about the axis of rotation 148, since the carrier is prevented from rotating by the clutch assembly 170. As the upper spider gear member 240 and the lower spider gear member 244 rotate they cause the left differential gear member 212, the center shaft 168, and the right differential gear member 176 to rotate about the axis of rotation 148.

Rotation of the right differential gear member 176 causes the upper spider gear member 188 and the lower spider gear member 192 to rotate relative to carrier 184. However, the rotation of the right differential gear member 176 does not cause the carrier 184 to rotate about the axis of rotation 148, since the carrier is connected to the sun gear 196, which is prevented from rotating by the clutch assembly 170. As the upper spider gear member 188 and the lower spider gear member 192 rotate they cause the left differential gear member 172, the shaft 144, and the rotor 140 to rotate about the axis of rotation 148. Therefore, in the alternator mode the transmission assembly 124 transfers torque from the shaft 126 and the right differential assembly 164 to the shaft 144 and the left differential assembly 156 to cause the rotor 140 to rotate.

Rotation of the rotor 140 relative to the stator 136 causes the electric machine 120 to generate electricity when operated as an alternator. The electricity generated by the BAS 100 may be used to power electrical accessories of the engine 104, to charge a battery (not shown), and/or to supply power to electrical accessories of a vehicle (not shown) associated with the engine.

In the alternator mode the rotor 140 and the pulley 284 rotate with the same angular velocity. Accordingly, one rotation of the rotor 140 results in one rotation of the pulley 284 when the BAS 100 is in the alternator mode. Also, the pulley 284 rotates with the same magnitude of torque as does the rotor 140 since in this gear configuration the planetary gear assembly 160 is prevented from providing mechanical advantage. Furthermore, since the torque imparted on the pulley 284 is transferred through two differential assemblies 156, 164 the pulley 284 rotates in the same direction as does the rotor 140. For example, when the pulley 284 rotates in a drive direction the rotor 140 also rotates in the drive direction.

In another embodiment, the BAS 100 is configured as a traction motor for a hybrid vehicle or an electric vehicle. When the BAS 100 is a traction motor it provides the driving force that moves a vehicle. For example, a wheel and tire assembly (not shown) may be connected to the shaft 126, and in the "starter" mode the BAS 100 imparts a torque on the wheel and tire assembly that rotates the wheel and tire assembly to drive the vehicle. When configured in the alternator mode, the BAS 100 is capable of braking the vehicle and charging a battery through a process commonly referred to as regenerative braking.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. An alternator-starter assembly associated with an internal combustion engine having a crankshaft and a drive member operatively connected to the crankshaft, comprising:
   an electric machine including a stator and a rotor, the rotor being configured for rotation relative to the stator;
   a transmission assembly including (i) a first drive shaft operatively connected to the rotor, (ii) a second drive shaft operatively connected to the drive member, and (iii) a gear assembly operatively connected to the first drive shaft and the second drive shaft, the gear assembly being configurable in a first gear configuration and a second gear configuration, the gear assembly including a planetary gear assembly and a center shaft, the planetary gear assembly including a ring gear, a plurality of planet gears, and a sun gear defining an opening through which the center shaft extends; and
   a controller operatively connected to the electric machine and configured to operate the electric machine as a generator when the gear assembly is in the first gear configuration and to operate the electric machine as a motor when the gear assembly is in the second gear configuration,
   wherein in the first gear configuration the ring gear, the sun gear, and the plurality of planet gears are prevented from rotating and the center shaft is rotatable, and
   wherein in the second gear configuration the ring gear and the center shaft are prevented from rotating and the sun gear and the plurality of planet gears are rotatable.

2. The alternator-starter assembly of claim 1, wherein:
   the transmission assembly further comprises a clutch assembly, and
   the clutch assembly configures the gear assembly in a selected one of the first gear configuration and the second gear configuration.

3. The alternator-starter assembly of claim 1, wherein:
   in the first gear configuration the transmission assembly transfers torque from the second drive shaft to the first drive shaft and causes the rotor to rotate, and
   in the second gear configuration the transmission assembly transfers torque from the first drive shaft to the second drive shaft and causes the drive member to rotate.

4. The alternator-starter assembly of claim 1, wherein:
   in the first gear configuration one rotation of the second drive shaft causes one rotation of the second drive shaft, and
   in the second gear configuration one rotation of the first drive shaft causes less than one rotation of the second drive shaft.

5. The alternator-starter assembly of claim 1, wherein rotation of the first drive shaft in a drive direction results in rotation of the second drive shaft in the drive direction.

6. The alternator-starter assembly of claim 1, wherein the transmission assembly further includes (i) a first differential assembly operatively connected to the sun gear, the center shaft, and the electric machine, and (ii) a second differential assembly operatively connected to the plurality of planet gears, the center shaft, and the drive member.

7. The alternator-starter assembly of claim 6, wherein:
   the transmission assembly further includes a clutch assembly operatively connected to the sun gear and the second differential assembly, and
   the clutch assembly is configured to configure the transmission assembly in a selected one of the first gear configuration and the second gear configuration.

8. An alternator-starter assembly associated with an internal combustion engine including a crankshaft and an engine drive member operatively connected to the crankshaft, comprising:
   an electric machine including a stator and a rotor configured to rotate relative to the stator;
   a planetary gear assembly including a ring gear, a plurality of planet gears, and a sun gear defining an opening;
   a center shaft extending through the opening;
   a first differential assembly operatively connected to the sun gear, the center shaft, and the electric machine, the first differential assembly including a first spider assembly operatively connected to the sun gear, a first differential gear member operatively connected to the first spider assembly and the rotor, and a second differential gear member operatively connected to the first spider assembly and the center shaft;
   a second differential assembly operatively connected to the plurality of planet gears, the center shaft, and the engine drive member, the second differential assembly including a second spider assembly operatively connected to the plurality of planet gears, a third differential gear member operatively connected to the second spider assembly and the center shaft, and a fourth differential gear member operatively connected to the second spider assembly and the engine drive member; and
   a clutch assembly operatively connected to the sun gear and the second differential assembly, the clutch assembly being configurable in a starter mode and an alternator mode, the clutch assembly including an alternator member operatively connected to the sun gear, a starter member operatively connected to the third differential gear member, and a movable member that is selectively positionable against one of the alternator member and the starter member.

9. The alternator-starter assembly of claim 8, wherein:
   in the starter mode the clutch assembly prevents rotation of the center shaft and enables rotation of the sun gear, and
   in the alternator mode the clutch assembly prevents rotation of the sun gear and enables rotation of the center shaft.

10. The alternator-starter assembly of claim 8, wherein:
    the first spider assembly includes a first spider gear member meshingly engaged with the first differential gear member and the second differential gear member, a second spider gear member meshingly engaged with the first differential gear member, the second differential gear member, and a first carrier configured to rotate about an axis defined by the center shaft, and
    the second spider assembly includes a third spider gear member meshingly engaged with the third differential gear member and the fourth differential gear member, a fourth spider gear member meshingly engaged with the third differential gear member, the fourth differential gear member, and a second carrier configured to rotate about the axis.

11. The alternator-starter assembly of claim 10, further comprising:
    a housing in which the planetary gear assembly, the first differential assembly, the second differential assembly, and the clutch assembly are at least partially positioned,
    wherein the ring gear is fixedly connected to the housing,
    wherein center shaft defines an axis of rotation, wherein in the starter mode the movable member is positioned against the starter member to prevent rotation of the center shaft, the second differential gear member, and the third differential gear member and to enable rotation about the axis of rotation of the sun gear, the first spider assembly, the plurality of planet gears, the second spider assembly, and the fourth differential gear member, and wherein in the alternator mode the movable member is positioned against the alternator member to prevent rotation about the axis of rotation of the sun gear and the plurality of planet gears, and to enable rotation about the axis of rotation of the first differential gear member, the second differential gear member, the center shaft, the third differential gear member, and the fourth differential gear member.

12. The alternator-starter assembly of claim 10, wherein:

in the starter mode the planetary gear assembly transfers torque from the first differential assembly to the second differential assembly and causes the drive member to rotate, and in the alternator mode the center shaft transfers torque from the second differential assembly to the first differential assembly and causes the rotor to rotate.

13. The alternator-starter assembly of claim 12, wherein:

in the starter mode one rotation of the first differential gear member causes one rotation of the fourth differential gear member, and in the alternator mode one rotation of the fourth differential gear member causes less than one rotation of the first differential gear member.

14. The alternator-starter assembly of claim 13, wherein rotation of the first differential gear member in a drive direction results in rotation of the fourth differential gear member in the drive direction.

15. A method of operating a starter-alternator assembly associated with an internal combustion engine including a crankshaft and an engine drive member operatively connected to the crankshaft, comprising:

configuring a transmission assembly of the starter-alternator assembly in a first gear configuration and rotating the engine drive member with an electric machine of the starter-alternator assembly; and configuring the transmission assembly in a second gear configuration and rotating a rotor of the electric machine with the engine drive member, wherein the transmission assembly is positioned between the electric machine and the engine drive member;

wherein the transmission assembly includes (i) a first drive shaft, (ii) a second drive shaft, and (iii) a gear assembly operatively connected to the first drive shaft and the second drive shaft, the gear assembly including a planetary gear assembly and a center shaft, the planetary gear assembly including a ring gear, a plurality of planet gears, and a sun gear defining an opening through which the center shaft extends;

wherein in the first gear configuration the ring gear, the sun gear, and the plurality of planet gears are prevented from rotating and the center shaft is rotatable; and wherein in the second gear configuration the ring gear and the center shaft are prevented from rotating and the sun gear and the plurality of planet gears are rotatable.

16. The method of claim 15, further comprising:

using a clutch assembly of the starter-alternator assembly to configure the transmission assembly in the first gear configuration; and using the clutch assembly to configure the transmission assembly in the second gear configuration.

17. The method of claim 16, further comprising:

sending a first electric signal to the clutch assembly to switch from the first gear configuration to the second gear configuration; and stopping the first electric signal to the clutch assembly to switch from the second gear configuration to the first gear configuration.

18. The method of claim 17, further comprising:

operating the electric machine as a motor with a controller when the transmission assembly is in the first gear configuration; and operating the electric machine as a generator with the controller when the transmission assembly is in the second gear configuration.

* * * * *